Sept. 25, 1962 J. L. SALZMANN 3,056,095
RING MODULATOR SYSTEM
Filed July 22, 1960 2 Sheets-Sheet 1
-fig. 1-
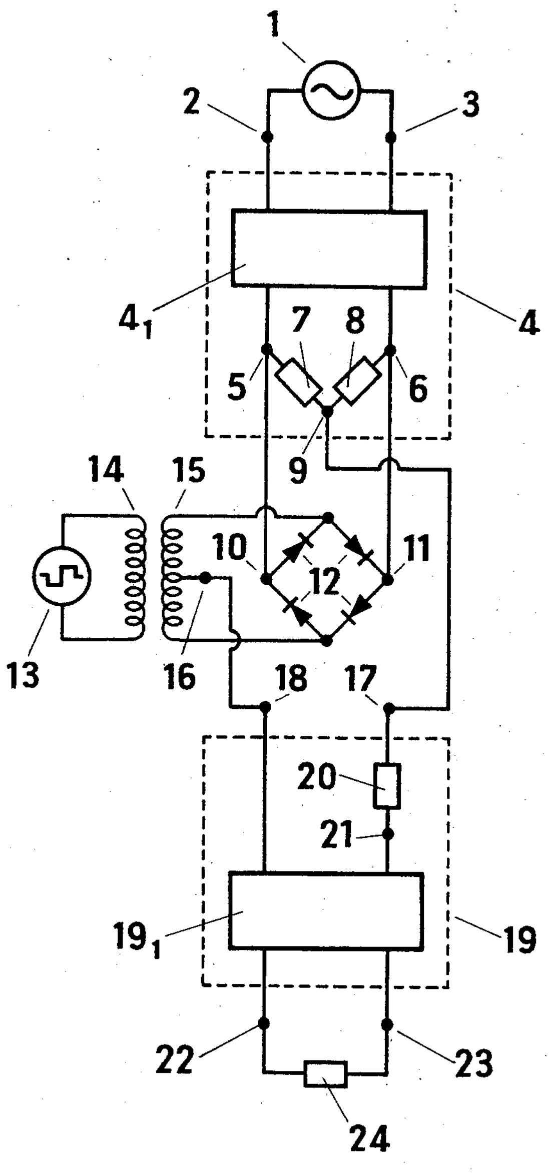

Sept. 25, 1962 J. L. SALZMANN 3,056,095
RING MODULATOR SYSTEM
Filed July 22, 1960 2 Sheets-Sheet 2
-fig: 2a-
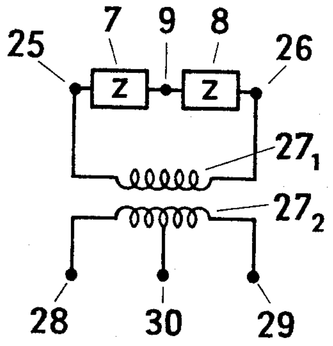
-fig. 2b-
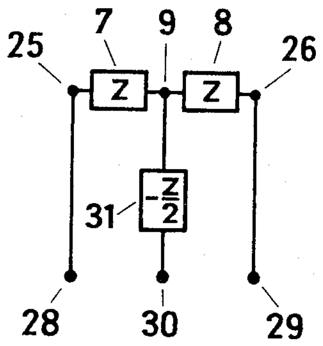
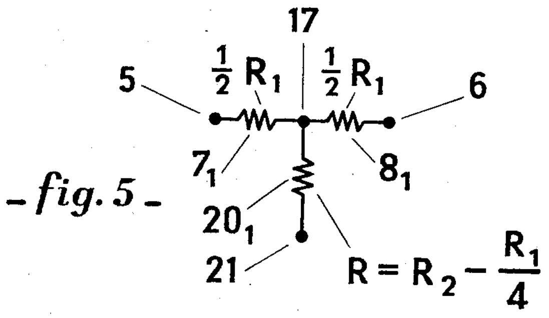
-fig. 5-
-fig. 3- -fig. 4-
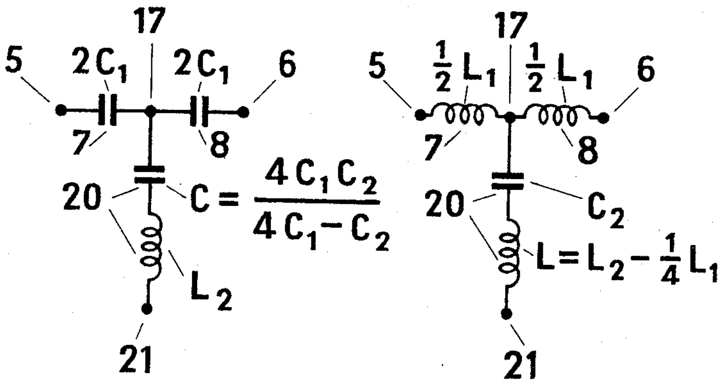

United States Patent Office 3,056,095
Patented Sept. 25, 1962

3,056,095

RING MODULATOR SYSTEM

Jean Louis Salzmann, Le Plessis-Robinson, France, assignor to Societe Anonyme de Telecommunications, Paris, France Filed July 22, 1960, Ser. No. 44,782
Claims priority, application France Sept. 29, 1959
6 Claims. (Cl. 332—47)

The present invention relates to improvements in so-called ring modulators, i.e. to modulators used in carrier current electric telecommunication systems for translating, with the aid of a locally generated carrier wave, signals occupying a given frequency band into another frequency band.

Ring modulators are well known in the art. They essentially comprise four rectifiers in bridge connection, first and second four-terminal frequency selective filters (also hereinafter designated respectively as input and output filters), means for connecting one pair of terminals of each one of said filters to said rectifier bridge, a carrier wave source coupled to said bridge through a transformer, means for applying the signals to be frequency-translated to the other pair of terminals (the "modulator input terminals") of said first filter and means for receiving frequency-translated signals at the other pair of terminals (the "modulator output terminals") of said second filter.

The various types of ring modulators employed in telecommunication practice differ from each other in the way in which the above-mentioned elements are interconnected. In a particular type, hereinafter referred to as "the conventional ring modulator," said first and second filters are respectively connected to the primary windings of two transformers, the secondary windings of which are provided with a mid-point connection and respectively connected at their end terminals to one and the other of the diagonals of said bridge. In this case, the carrier wave source is connected through its associated transformer between the mid-points of the secondary windings of one and the other of said two transformers.

It is also well-known that the latter said transformers must fulfil very strict conditions relating to the symmetry of their windings, this mainly to avoid transmission of the carrier wave toward the input and output terminals of the modulator assembly.

In another ring modulator type, sometimes called "series-fed ring modulator," the parts played by the second filter and the carrier wave source are interchanged; i.e., the carrier wave source transformer is connected across one diagonal of said bridge, while the second filter has one of its terminal pairs connected to the mid-point of the secondary winding of the first transformer (i.e. the transformer which couples the first filter to the bridge) and the other to a mid-point provided on that winding of the carrier wave source transformer which is connected to the bridge. In the latter case, the second (output) filter transformer can be omitted.

From a theoretical viewpoint, the design of a ring modulator is by no means a simple problem, as an exact analysis of its operation makes it necessary to consider the selective properties of its terminations and, in particular, the values of the effective impedances of both input and output filters as seen from the rectifier bridge, and this for each filter not only in its own frequency passband, but also in the passband of the other and even at a number of spurious frequencies corresponding to high order modulation products.

This problem has been dealt with by various authors, more particularly by D. G. Tucker in a paper entitled "Rectifier modulators with frequency selective terminations," published in the British review "Proceedings of the Institution of Electrical Engineers," part III, vol. 96, 1949, pp. 422–428, and by J. Gensel, in a paper entitled "Das Verhalten von Modulatorschaltungen bei komplexen, insbesondere selektiven Anschlüssen," published in the German review "Frequenz," vol. 11, 1957, pp. 153–159 and 175–185. The theoretical method proposed by these authors makes it possible to determine the operating conditions and efficiency of a ring modulator, assuming that the filters are directly connected with the rectifier bridge and that their impedances, as seen from the bridge, fulfil certain conditions. However, as already mentioned, the insertion of transformers—or at least of one transformer—between the bridge and the filters, a practical necessity in both conventional and series-fed ring modulators, introduces a new factor of complexity in the system as, for frequencies outside its normal passband, any transformer, however well-built, introduces many spurious reactances, in the form of stray capacitances and leakage inductances, and in fact behaves like a rather complicated network, the apparent impedance of which for such frequencies cannot be expected to fulfil well-defined and prescribed conditions.

To obviate this drawback, and at the same time to facilitate calculation, it has been proposed to insert attenuating networks, made up of resistances, between the bridge and the filters, so as to provide the bridge with terminations practically equal to pure resistances. However, the so obtained improvement in modulator design and operation has its counterpart in a heavy loss in the overall efficiency of the system.

The main object of the present invention is a new type of ring modulator including a special and very simple circuit for the coupling of the rectifier bridge to the filters, according to an arrangement derived from that of a series-fed ring modulator, but in which the use of a transformer directly connected between the bridge and one of the filters is no longer necessary, said transformer being replaced by this simple circuit, the apparent impedance of which on its bridge side is easily controlled; the latter circuit is realized in the form of a simple modification of the bridge-side terminal sections of the filters.

The device of the invention is free from inherent losses and its efficiency is as high as could be obtained with an ideal transformer.

According to the present invention, there is provided a frequency-changing device comprising, in combination, a carrier wave source, four rectifiers in bridge connection, a transformer having its primary winding fed from said source and its secondary winding connected across one diagonal of said rectifier bridge, a mid-point connection on said secondary winding, first and second frequency selective filters each having input and output terminals, means for applying input signals from a signal source to the input terminals of said first filter, means for impressing signals received at the output terminals of said second filter upon an output circuit, connections for applying signals received at output terminals of said first filter to the other diagonal of said rectifier bridge, and first and second connection means respectively connecting one and the other of the input terminals of said second filter to said mid-point connection of said secondary winding and to a point in a shunt circuit connected across output terminals of said first filter, wherein said shunt circuit consists of two series-connected equal impedances, and wherein above-said point in said shunt circuit is the common point to said equal impedances.

The device of the invention is, of course, a reversible one, like any ring modulator, and input signals might as well be applied to the output terminals of said second filter and frequency-changed signals received at the input terminals of said first filter, provided the frequencies of the signals applied to each one of said filters be comprised in its own passband.

The advantages and working conditions of the invention will be better understood from the hereinafter given detailed description, made with reference to the annexed drawings, of which:

FIG. 1 is a diagram of a modulator circuit according to the invention.

FIGS. 2*a* and 2*b* are diagrams showing how an ideal transformer can be replaced by a simple circuit according to the invention.

FIGS. 3, 4 and 5 show various embodiments of certain parts of the circuit of FIG. 1.

A detailed explanation of the operation of the device of the invention will now be given with the aid of some of the results established in the above-mentioned Gensel paper.

Also like in the Gensel paper, it will be assumed hereinafter that the assembly of the bridge rectifier and carrier wave source with its transformer operates like an ideal reversing switch, i.e. that the carrier wave voltage has a substantially rectangular wave shape, a condition practically fulfilled in most modern ring modulators.

Referring now to FIG. 1, the signal source voltage of frequency $f$ delivered by the signal source 1 is applied to the input terminals 2, 3 of the input filter 4, the output terminals 5, 6 of which are respectively connected to one and the other of the apices 10, 11 of a diagonal of the rectifier bridge 12. Filter 4 eliminates any spurious frequencies from source 1 which might disturb the operation of the modulator. The output terminals 5, 6 of 4 are shunted by the series assembly of two equal impedances 7, 8 of value Z, the common point to which is 9. This assembly is a part of the bridge-side termination of filter 4, the remaining part of which may be seen at $4_1$. A carrier voltage of frequency F delivered by the carrier wave source 13 is applied through a transformer with a primary winding 14 and a secondary winding 15 to the second diagonal of 12, to the apices of the second diagonal of which the end terminals of 15 are connected. The secondary winding 15 is provided with a mid-point connection 16.

The common point 9 to impedances 7, 8 is connected to one of the input terminals 17 of the output filter 19, while the other input terminal 18 of the same filter is connected to the mid-point 16 of the secondary winding 15 of the carrier-wave transformer (14, 15). A frequency-translated voltage of frequency $(F+f)$ or $(F-f)$ is received at terminals 17, 18. Filter 19 eliminates any extraneous frequencies outside the useful band of the frequency-translated signals. As it may be seen in FIG. 1, the output filter 19 is series-terminated at its input terminal 17, and includes a series-connected impedance 20 which is a part of said output filter, the remaining part $19_1$ of which is connected to 20 at point 21. The output terminals 22, 23 of 19 may be connected to an output circuit, shown at 24 in FIG. 1.

Referring now to FIGS. 2*a* and 2*b*, where identical reference numbers have the same significance as in FIG. 1 the latter figures respectively show two perfectly equivalent circuits. The circuit of FIG. 2*a* includes an ideal transformer with a 1/1 turn ratio ($27_1$, $27_2$) across the primary winding of which a pair of series-connected impedances 7, 8 of equal value Z is connected at terminals 25, 26. The secondary winding $27_2$ of this transformer is provided with end terminals 28, 29 and a mid-point terminal 30. Now, it is well known in circuit theory that the circuit of FIG. 2*a* is fully equivalent to that of FIG. 2*b*, where terminals 25, 26 are directly connected to 28 and 29 respectively, with the common point 9 to 7 and 8 connected to 30 through a fictitious negative impedance 31 of value $(-Z/2)$.

Referring now again to FIG. 1, and taking advantage of the equivalence of the circuits of FIGS. 2*a* and 2*b*, it is easily seen that the assembly (7, 8, 20) of FIG. 1 plays exactly the same part as the ideal transformer of FIG. 2*a* would do if its terminal pairs 25, 26, and 28, 29 (FIG. 2*a*) were respectively connected on one hand to terminals 5, 6 and on the other hand to terminals 10, 11 of FIG. 1, with the mid-point 30 of FIG. 2*a* connected at 17 to impedance 20 of FIG. 1, subject to the latter impedance being increased by a value equal to half the common impedance value Z of 7 and 8, to compensate for the absence of the negative impedance 31 of value $(-Z/2)$ of FIG. 2*b*. Thus the circuit of FIG. 1 is a perfect substitute for a conventional series-fed ring modulator that would be provided with an ideal filter-to-bridge coupling transformer, provided the value of 20 be altered as just mentioned.

The rules of design of the elements of FIG. 1, and more particularly those relating to impedances 7, 8, 20 and to the dimensioning of filters 4 and 19 will now be given on the basis of the already known results mentioned in the Gensel paper for the series-fed ring modulator. Two main cases will be successively considered, firstly that of an ideal lossless modulator with purely reactive impedances 7, 8 and 20, and secondly that where, owing to the impossibility of physically realizing impedance 20 or of building filters with suitable impedance behavior outside their passband, some attenuation has to be introduced into the system by substituting resistances for impedances 7, 8 and 20.

Considering first the case of a zero attenuation modulator, it is known from the theory of the series-fed ring modulator that maximum energy transfer requires proper matching of the filters to the rectifier bridge and to each other. Assuming filters 4 and 19 to be suitably terminated at the former's input terminals 2, 3 and the latter's output terminals 22, 23, respectively, and designating by $Z_1$ the output image impedance of 4, as seen from terminals 5, 6 and by $Z_2$ the input image impedance, as seen from terminals 17, 18, of a modified output filter derived from 19 by adding to impedance 20 an impedance of value equal to half that of 7 or 8 (to take due account of the equivalence rule of circuits of FIGS. 2*a* and 2*b* as already explained), matching is obtained if:

(*a*) $Z_1$ is zero or at least has but a small value outside the passband of the input filter 4

(*b*) $Z_2$ has a very high value outside the passband of filter 19

(*c*) $Z_2$ is substantially equal to $1/\pi^2$ times $Z_1$ if the values of $Z_2$ and $Z_1$ are respectively taken at the middle frequencies of the passbands of said filters 4 and 19, i.e. are the "nominal values" $Z_{20}$ and $Z_{10}$.

It is known that both $Z_1$ and $Z_2$ are real in the respective passbands of the filters and that their values do not much depart from the "nominal values" $Z_{10}$ and $Z_{20}$, at least in well-built filters.

Conditions (*a*) and (*b*) make it necessary that filters 4 and 19 be respectively shunt- and series-terminated, as shown in FIG. 1; condition (*c*) gives the rule to be applied for the dimensioning of the elements of both filter structures.

Referring now to FIGS. 1 and 3, and assuming for instance, that filter 4 is a shunt-terminated low-pass filter and that filter 19 is a series-terminated band-pass filter, the bridge-side termination of filter 4 at terminals 5, 6 (FIG. 1) may be a capacitive one with a capacity value $C_1$. Similarly, the bridge-side series-termination of filter 19 (assumed to be modified as above-explained for impedance 20), may consist of an inductance $L_2$ series-connected with a condenser having a capacity value $C_2$. Thus impedances 7, 8 of FIG. 1 will consist of two series-connected condensers each with a capacity $2C_1$ (FIG. 3) while impedance 20 will consist of inductance $L_2$ (FIG. 3) in series with a condenser C having a capacity equal to $4C_1C_2/4C_1-C_2)$, the latter value resulting from the merging of $C_2$ and of a fictitious negative capacity $(-4C_1)$. Of course, inductance $L_2$ and capacities $C_1$ and $C_2$ should be so dimensioned that the above-mentioned condition relating to the proper value of the $Z_{20}/Z_{10}$ ratio should approximately be fulfilled.

Referring now to FIG. 4, it will be assumed that filter 4 is a band-pass filter, shunt-terminated by a resonant circuit consisting of a condenser and an inductance $L_1$ in parallel connection, while filter 19, also a band-pass filter, is series-terminated by a series-resonant circuit which would normally consist of an inductance $L_2$ and a condenser $C_2$. In this case, the two impedances 7, 8 of FIG. 1 will be two equal inductances 7, 8 (FIG. 4) of value $L_1/2$; impedance 20 of FIG. 1 will consist of condenser $C_2$ in series with an inductance L of value $(L_2-L_1/4)$, as shown in FIG. 4.

However, such arrangements as those of FIGS. 3 and 4 are not always possible as, for certain values of the relative bandwidths of the filters and of the ratios of their extreme frequencies, one might be led to negative, not physically realizable values for L or C. Or, else, the filters, although physically realizable, might have too different a behavior outside their passbands from the ideal one defined above.

In such a case, it is still possible to build a modulator according to the invention by replacing, in the diagram of FIG. 1, impedances 7, 8 by equal resistances $7_1$, $8_1$ of values $R_1/2$, as shown in FIG. 5. Conventional dimensioning rules of filters for proper matching still hold good, provided said resistances be considered as a part of filter 4, and provided a corresponding resistance $20_1$ (FIG. 5) of suitable value be substituted for the series-termination 20 of filter 19.

It must be pointed out that, if such resistances are added to the filters, it is no longer necessary that the output impedance $Z_1$ of filter 4 and the input impedance $Z_2$ of filter 19 be respectively very low and very high outside their passbands. In fact, the reverse condition may exist, and even be of some advantage in special cases; nor is it necessary that the series-termination of one of said filters be modified as previously explained in the case of a lossless modulator, as matching can then be obtained by giving suitable values to resistances $7_1$, $8_1$ and $20_1$ (taking account for the latter of a fictitious resistance $R_1/4$ added to its actual value R) and to the ratio of the nominal impedances of the filters.

Assuming, for instance, $Z_1$ to be practically infinite and $Z_2$ practically zero outside the respective passbands of 4 and 19, it is well known that the matching condition for the above-defined nominal impedances is that $Z_{20}$ equals $\pi^2 Z_{10}/16$, if no resistances are added. If such additional resistances as $7_1$, $8_1$ and $20_1$ (FIG. 5) are provided, simple calculations show that, if $R_1$ equals $(1/a)$ times the nominal (middle frequency) output image impedance $Z_{10}$ of filter $4_1$ (FIG. 1), the value $R_2$ of the resistance that, added as a series-termination to filter 19, would match $R_1$ in the diagram of FIG. 2*a*, should be *a* times the nominal input impedance $Z_{20}$ of the latter filter, *a* being a factor always smaller than unity. Consequently, resistance $20_1$ of FIG. 5 should have the value $(R_2-R_1/4)$. Of course, the ratio of the nominal impedances of the filters and, hence, the value of $R_2/R_1$ should be calculated as functions of *a*. Minimum attenuation obviously occurs if R is zero, i.e. if $R_2$ equals $R_1/4$. As $R_2/R_1$ is a function of *a*, the latter condition can only be fulfilled for a particular value of *a*, which has been found to be 0.593 (or 1/1.69). The calculated corresponding minimum power attenuation is about 10.7 decibels.

Modulators according to the invention have actually been built and experimental results have been found to be in accordance with the theoretical data. In a first example of embodiment, a modulator translating the 0.3–3.4 kc./s. telephonic band into the 24.3–27.4 kc./s. and including additional resistances has been built. An average attenuation value of 12 decibels has been obtained, of which about 1.3 decibels were attributable to losses in filters 4 and 19 (FIG. 1). The input impedance of the assembly, measured from input terminals 2, 3, was practically constant (within 20 percent) in the 0.3–3.4 kc./s. band, even with the output terminals 22, 23 open-circuited. These results were obtained with silicon rectifiers having a rather high resistance.

In another example of embodiment the 12–34 kc./s. band was translated into the 38–60 kc./s. with the aid of a 72 kc./s. carrier wave of rectangular shape. No additional resistances were used. The measured impedance mismatch never exceeded 30 percent, i.e. it was of the same order of magnitude as that of the filters proper, while the overall attenuation of the system was comprised between 1.3 and 1.6 decibels.

The invention does not preclude the use of transformers in a ring modulator, if they are necessary for such purposes as, for instance, D.C. potential isolation of certain parts of the circuit with respect to others. However, such transformers should not be directly connected to the rectifier bridge and should preferably be separated therefrom by the filters, or at least by part of the latter, so as to give the circuit (as seen from the bridge) well-defined impedances and so to eliminate the spurious impedances introduced by the transformers.

What is claimed is:

1. A frequency-changing device comprising, in combination, a carrier wave source, four rectifiers in bridge connection, a transformer having its primary winding fed from said source and its secondary winding connected across one diagonal of said rectifier bridge, a mid-point connection on said secondary winding, first and second frequency selective filters each having input and output terminals, means for applying input signals from a signal source to the input terminals of said first filter, means for impressing signals received at the output terminals of said second filter upon an output circuit, connections for applying signals received at output terminals of said first filter to the other diagonal of said rectifier bridge, and a coupling network connecting one and the other of the input terminals of said second filter to said mid-point connection of said secondary winding and to the output terminals of said first filter, respectively wherein said network consists of three impedances in star connection around a common terminal, two of which are equal impedances and the third of which has a value substantially equal to half the negative of the common value to said equal impedances, said equal impedances having their non-common terminals connected to one and the other of the output terminals of said first filter, respectively, while the non-common terminal of said third impedance is connected to one of the input terminals of said second filter and the other of latter said input terminals is connected to said mid-point connection of said secondary winding.

2. A frequency-changing device as claimed in claim 1, wherein said first filter is shunt-terminated at its output terminals, wherein said second filter is series-terminated at its input terminals, said equal impedances being reactances included in the shunt termination of said first filter, wherein the series termination of said second filter at its input terminals consists of a further impedance having a value substantially equal to that which would normally series-terminate said second filter for giving it an approximately constant input image impedance within its passband less a reactance value equal to half that of said equal impedances.

3. A frequency-changing device as claimed in claim 2, wherein said equal impedances are capacitances, and wherein said further impedance includes a series capacitance.

4. A frequency-changing device as claimed in claim 2, wherein said equal impedances are inductances, and wherein said further impedance includes a series inductance.

5. A frequency-changing device as claimed in claim 1, wherein said equal impedances are resistances, and wherein said third impedance consists of a further resistance.

6. A frequency-changing device as claimed in claim 5, wherein said further resistance is a zero resistance, and wherein the sum of the values of said equal resistances is substantially equal to 1.69 times the output impedance of said first filter at the middle frequency of its passband, said first filter being series-terminated at its output terminals and said second filter being shunt-terminated at its input terminals.

References Cited in the file of this patent

UNITED STATES PATENTS

| | | |
|---|---|---|
| 2,236,856 | Penick | Apr. 1, 1941 |
| 2,829,343 | Miller | Apr. 1, 1958 |

FOREIGN PATENTS

| | | |
|---|---|---|
| 696,583 | Germany | Sept. 25, 1940 |